United States Patent
Oster et al.

(10) Patent No.: US 10,691,079 B2
(45) Date of Patent: Jun. 23, 2020

(54) SECURE ELECTRONIC DEVICE

(71) Applicant: Phoenix Contact GmbH & Co. KG, Blomberg (DE)

(72) Inventors: Viktor Oster, Blomberg (DE); Kai Grube, Bad Muender (DE); Carsten Gregorius, Bad Pyrmont (DE)

(73) Assignee: PHOENIX CONTACT GMBH & CO.KG, Blomberg (DE)

( * ) Notice: Subject to any disclaimer, the term of this patent is extended or adjusted under 35 U.S.C. 154(b) by 135 days.

(21) Appl. No.: 15/326,472

(22) PCT Filed: Jul. 15, 2015

(86) PCT No.: PCT/EP2015/066202
§ 371 (c)(1),
(2) Date: Jan. 14, 2017

(87) PCT Pub. No.: WO2016/008945
PCT Pub. Date: Jan. 21, 2016

(65) Prior Publication Data
US 2017/0205777 A1    Jul. 20, 2017

(30) Foreign Application Priority Data
Jul. 16, 2014   (DE) .................. 10 2014 110 018

(51) Int. Cl.
*G05B 9/02* (2006.01)
*H01H 47/00* (2006.01)
*G05B 15/02* (2006.01)

(52) U.S. Cl.
CPC ............ *G05B 9/02* (2013.01); *H01H 47/002* (2013.01); *G05B 15/02* (2013.01); *G05B 2219/24008* (2013.01); *G05B 2219/25119* (2013.01)

(58) Field of Classification Search
CPC ...... G05B 9/02; G05B 15/02; G05B 19/0425; G05B 19/0423; G05B 2219/23378;
(Continued)

(56) References Cited

U.S. PATENT DOCUMENTS 6,185,466 B1   2/2001   Nicewonger
6,628,015 B2   9/2003   Pullmann et al.
(Continued)

FOREIGN PATENT DOCUMENTS

DE              100 11 211 A1   9/2001
DE     10 2004 016 929 A1   11/2004
(Continued)

OTHER PUBLICATIONS

English translation of Albrecht al. EP1847891 (A1), Oct. 24, 2007 (Year: 2007).*
(Continued)

*Primary Examiner* — Robert E Fennema
*Assistant Examiner* — Shon G Foley
(74) *Attorney, Agent, or Firm* — John Maldjian; Maldjian Law Group LLC

(57) ABSTRACT

The invention relates to a safe electronic device which has multichannel logic circuitry, a single channel input device, an output device, and a storage device. Data items, each of which is associated with an input value, are stored in the storage device. The multichannel logic circuitry is comprised of a first control unit and a second control unit. The first control unit reads in an input value which has been input, and transmits the input value to the second control unit which actuates the output device for outputting of optical and/or acoustic information, in response to the input value which has been input. If the optical and/or acoustic information corresponds to the input value, the selected data item is released for further use.

11 Claims, 2 Drawing Sheets

(58) Field of Classification Search
CPC ........... G05B 2219/25119; G05B 2219/24003; G05B 2219/24146; H01H 2300/03; H01H 47/002; Y04S 20/14; Y02B 90/224
See application file for complete search history.

(56) References Cited

U.S. PATENT DOCUMENTS

| | | | |
|---|---|---|---|
| 7,130,703 B2 | 10/2006 | Ott et al. | |
| 7,705,492 B2 | 4/2010 | Pullmann et al. | |
| 2002/0055791 A1* | 5/2002 | Okamoto | G05B 15/02 700/83 |
| 2003/0058623 A1* | 3/2003 | Veil | F16P 3/00 361/728 |
| 2007/0290788 A1 | 12/2007 | Erkens | |
| 2011/0266890 A1* | 11/2011 | Lorenz | G05B 19/0425 307/125 |

FOREIGN PATENT DOCUMENTS

| | | |
|---|---|---|
| DE | 10 2004 038 306 A1 | 3/2006 |
| DE | 10 2005 048 601 B3 | 4/2007 |
| DE | 10 2010 026 392 A1 | 1/2012 |
| EP | 1 847 891 A1 | 10/2007 |

OTHER PUBLICATIONS

International Search Report issued in connection with corresponding International Application No. PCT/EP2015/066202 dated Oct. 1, 2015 (3 pages total).

* cited by examiner

SECURE ELECTRONIC DEVICE

FIELD

The invention relates to a safe electronic device which is capable of safely transmitting input values; and a method of fault-free configuration of a safe electronic device.

BACKGROUND

Safe switching devices capable of setting and/or changing, e.g., time parameters for delayed shutting off of a load, with use of a potentiometer are well known. In order to safely and reliably detect an inputted value, which is a value that has been input, two-channel potentiometers are used. A two-channel potentiometer is understood to be a potentiometer device whereby, depending on the setting of the potentiometer, two analog values are generated, which enable safe checking of the input value.

The present invention, remedies the deficiencies of other safe switching devices by devising an alternative safe electronic device which enables fault-free configuration and/or programming.

SUMMARY

The core concept of the invention, and the embodiments disclosed herein, may be described as providing a safe electronic device which is comprised of multichannel logic circuitry, a single-channel input device, an output device, and a storage device. Data items, each of which corresponds to a given input value, are stored in the storage device. The multichannel logic circuitry is comprised of a first and second control device (or control unit). The first control device reads in a first input value which has been input, and transmits the input value to the second control device, which actuates the output device, for outputting of optical and/or acoustic information, in response to the inputted value. If the optical and/or acoustic information corresponds to the input value, access to the selected data item is allowed, and the selected data item can be employed further.

The above-described technical problem is solved by the features of claims 1 and 11.

According to another aspect of the invention, the input device is comprised of a plurality of manually actuatable switches, particularly DIP switches.

According to still another aspect of the invention, the safe electronic device is in the form of a multichannel safe switching device, for safe switching off of an electrical load (electrical consuming device).

These and other advantages will be apparent from the present application of the embodiments described herein.

The preceding is a simplified summary to provide an understanding of some embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures.

Figure 1:
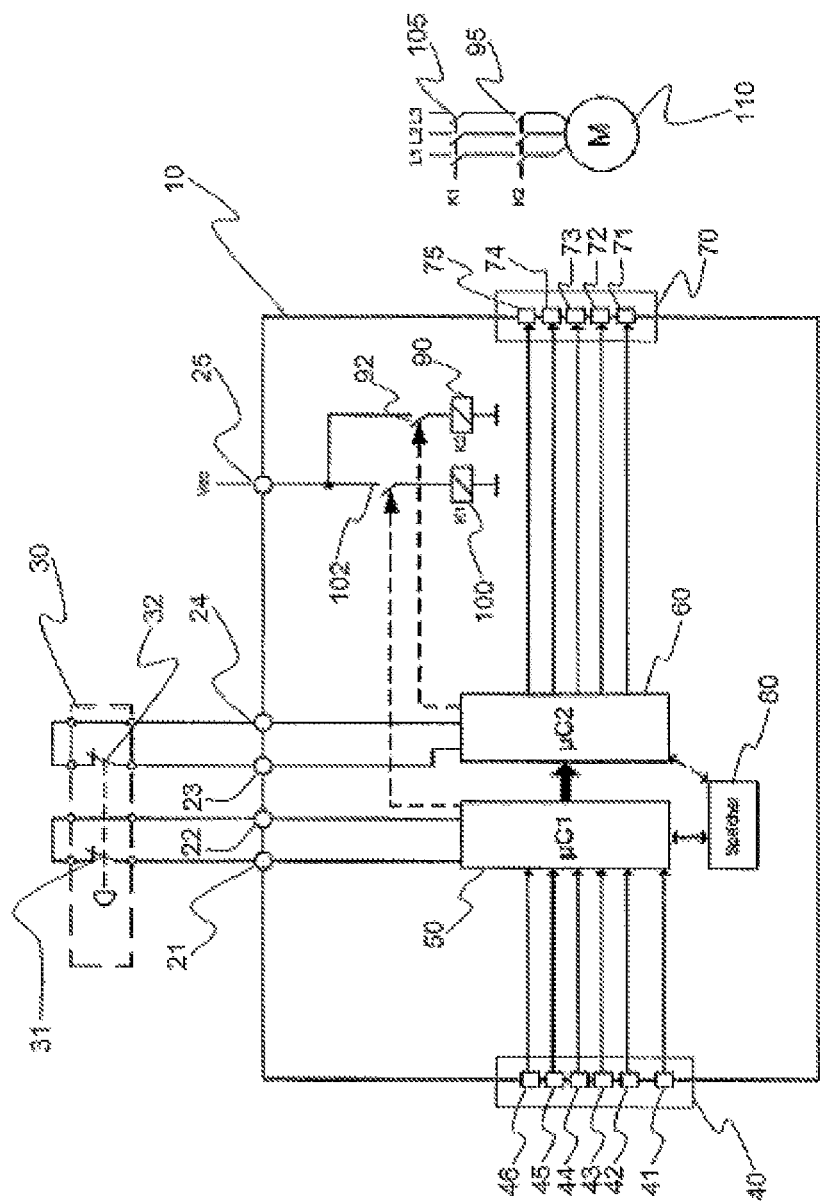
FIG. 1 shows a representation of a safe electronic device having monochrome LED display elements which can be actuated to be luminous, as in one embodiment.

While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the particular form disclosed, but to the contrary, the present disclosure is to cover all modification, equivalents, and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present disclosure will be described below in conjunction with exemplary safe electronic devices. Those skilled in the art will recognize the disclosed techniques may be used in creating any safe electronic device utilizing input values for data item management.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1 illustrates a safe electronic device 10 which may be in the form of, e.g., a safe switching device [(switching device with safety protections)].

The safe electronic device 10 has an input device 40 for inputting the input values, which device 40 is designed for single channel operation. This means that an input value which is input is passed to a first control device (or control unit) 50 without duplication or any other manner of splitting. The first control unit 50 is in the form of, e.g., a microcontroller.

According to an advantageous embodiment, the input device may have a plurality of first, manually actuatable switches 42 to 46, which may be in the form of, e.g., DIP switches. With this arrangement, an input value is input by setting a corresponding binary code or bit pattern on the DIP switches 42 to 46.

A second control device (or control unit) 60, which also may be in the form of a microcontroller, is connected on its (device 60's) input side to the first control unit 50 and is connected on its output side to an output device 70, such that an input value can be processed in a two-channel mode. The second control device is designed to be able to control the output device 70 in response to an inputted input value, such that the output device 70 emits optical and/or acoustic information which (under conditions of lack of faults) corresponds to the input value.

According to an advantageous embodiment, the output device 70 is in the form of a display device for outputting optical information. Preferably, the display device 70 has a plurality of monochrome display elements which can be actuated to be luminous, 71 to 75, each of which elements is associated with one of the switches 42 to 46. Each monochrome luminous element 71 to 75 contains an LED of a predetermined color. As illustrated in FIG. 1, for purposes of example, the following are associated (coordinated): DIP switch 42 is associated with LED display element 71, DIP switch 43 is associated with LED display element 72, DIP switch 44 is associated with LED display element 73, DIP switch 45 is associated with LED display element 74, and DIP switch 46 is associated with LED display element 75.

As may be seen from FIG. 1, the second control unit 60, on its output side, controls each of the LED display elements 71 to 75 individually.

The safe electronic device 10 has a storage device 80 in which a plurality of predetermined data items are stored, each of which data items is associated with a respective input value. The input values may comprise a plurality of predetermined, i.e. admissible, input values, each of which is associated with a predetermined data content (data item). The data items may comprise, e.g.:

parameter values, e.g. operating parameters and/or configuration parameters; [and/or]

programs, e.g. subprograms and/or main programs;

which, e.g., control the operation of the safe electronic device 10.

For example, stored configuration parameters may represent various delay times which may result in the control of delayed shutoff of an electrical load 110. The storage device 80 may advantageously be in the form of a lookup table, capable of associating each stored data item with a unique input value. It is also conceivable for the storage device 80 to be integrated into the first microcontroller 50 and/or the second microcontroller 60. The design and implementation aspects of the storage device 80 are not relevant to the invention.

The first control unit 50 and/or second control unit 60 are/is designed to control access to the predetermined data item which is associated with the input value which has been input, such control being in response to an actuating signal from the input device 40.

In this connection, the input device 40 can be designed for input of a confirmation signal, i.e. for input of a confirmation which signals that an input value which has been input corresponds to the information which is being (or has been) output by the output device 70. Advantageously, for this purpose, the input device 40 may have a second manually actuatable switch 41 which, upon actuation, supplies an actuating signal to the first control unit 50 and/or the second control unit 60.

The first control unit 50 may advantageously be designed to read out an input value which has been input from the input device 40, when the second switch 41 is in its first position, so as to initiate a configuration mode. Alternatively, or in addition, it can be designed to interpret the second position of the second switch 41 as indicating that the input value corresponds to the output information. It is also conceivable to provide a separate switch or button (key) for input of a confirmation signal (not shown).

Instead of the DIP switches, the input device 40 can also have at least one potentiometer (not shown). In this case, an input value which has been input is associated with a specific potentiometer position, which causes a corresponding analog input signal. In this case, an analog to digital converter (A/D converter) which is designed to convert an analog input value into a binary signal which can be processed by the control units 50 and 60 may be provided between the potentiometer and the first control unit 50.

In order to be usable as a safe switching device (for example), the safe electronic device 10 may have four connections 21 to 24, to which, e.g., a two-channel emergency shutoff device 30 may be connected. The emergency shutoff device 30 may be associated with, e.g., a security-critical process. In the Figure, the emergency shutoff device 30 is represented symbolically by two rigidly joined switches 31 and 32. One of the switches 31 is connected to the input of the first control unit 50, via the connections 21 and 22, and the second switch 32 is connected to the input of the second control unit 60, via the connections 23 and 24. Additionally, the safe electronic device 10 may have a connection 25 to switch on a supply voltage. The supply voltage can, inter alia, be connected to a two-channel output stage, which has two switching relays 90 and 100, which are also designated K2 and K1 in the Figure. The switching relays 90 and 100 have, e.g., respective contacts 95 and 105, which can switch off or switch on the electrical load 110, which may be e.g. a motor 110. The time-related switching-off behavior is realized by delayed switching-off of the relays 90 and 100.

The first control unit 50 actuates the switching relay 100 via the switch 102, while the second control unit 60 actuates the switching relay 90 via the switch 92. This creates a two-channel output stage.

The two control units 50 and 60 can be regarded as a two-channel logic circuit of the safe electronic device 10, because the first control unit 50 assumes the task of inputting an inputted value at the input device 40, and transferring said input value to the second control unit 60, which assumes the task of actuating the output device 70.

Below, the functioning of the electronic device 10 illustrated as an exemplary embodiment will be described in more detail.

Assume that when the emergency shutoff device 30 is actuated it is the task of the electronic device 10 to shut off the motor 110 within one second of time. E.g., an operator will be able to tell, from a table, that the related configuration parameter "delay time 1 second" has been stored in the storage device 80, at the address 01101.

To initiate the configuration mode, as an example the DIP switch 41 is set to a first switch position provides a logic "high signal". In response to the logic high signal, the first control unit 50 recognizes that a configuration mode has now been started, i.e. that an input value can be input.

Then an operator (operating individual) at the DIP switches 42 to 46 inputs an input value in the form of a bit pattern by appropriately setting the DIP switches 42 to 46. Let us assume that the bit pattern 01101, which corresponds to the decimal number 13, is set on the DIP switches 42 to 46. This bit pattern corresponds to the address at which the configuration parameter "delay time 1 second" is stored in the storage device 80.

The microcontroller 50 then reads out the bit pattern and transfers the input value which has been input, in the form of corresponding high and low signals, via its data interface, to the second control unit 60. The second control unit 60 controls the LED display elements in such a manner that, e.g., the LED display elements 71, 73, and 74 light up, and the display elements 72 and 75 remain dark. It is also conceivable, e.g., that the display device 70 is a seven-segment display device, and that the second control unit 60 is designed to convert the received bit pattern into a control signal which causes the display device 70 to display the corresponding decimal number "13".

In error-free operation, the operator recognizes by means of the LED display elements 71 to 75 that the bit pattern set on the DIP switches 42 to 46 has been correctly read in. The LED display elements 71 to 75 assume luminous states in accordance with the set bit pattern. Since the bit pattern which has been inputted corresponds to the optical information on the display device 70, the operator switches the DIP switch 41 into a second switch position (a "confirming position"), so that a "low signal" is now generated by the input device 40. The first control unit 50 interprets the "low signal" of the DIP switch 41 as a confirmation signal. Depending on the implementation, the first control unit 50 and/or the second control unit 60 can be configured to control access to the data content addressed by the inputted bit pattern, in response to the acknowledged confirmation signal. It is also conceivable that the first control unit 50, when it recognizes the confirmation signal of the second control unit 60, will allow access to the addressed data content and/or use of the data.

It should be noted that there is an erroneous processing of the input bit pattern when the bit pattern and the optical information displayed by the LED display elements 71 to 75 do not correspond. In this case, the configuration process should not be terminated, i.e. the second switch 41 should not be shifted to the second switch position. Thanks to the two-channel design of the electronic device 10, possible faults in the input circuit, e.g. short circuits or interruptions in the input device 40, or in the connection path between the input device 40 and the first control unit 50, or a defective control unit 50, or faults in the control circuit, such as short circuits or interruptions in the output device 70, or faults in the connection path between the output device 70 and the second control unit 60, or a defective control unit 60, can be indirectly detected if the displayed values do not correspond to the input values.

In the presently supposed fault-free operation, both control units use the inputted bit pattern 10110 as an input value, which is associated with a delay time of 1 second, in order to read out and process the configuration parameter "delay time of 1 second", if necessary.

Now let us assume that a fault has occurred in the safety-critical process and an operator has actuated the emergency shutoff switch 30, i.e. the switches 31 and 32 have been opened. In response to the open switch 31 and the previously configured delay time stored in the storage device 80, the first control unit 50 causes the external switches 105 of the switching relay 100 to be opened after 1 second. At the same time, the second control unit 60, in response to the opened switch 32 and the configured delay time, causes the switches 95 of the switching relay 90 to be opened after 1 second. In this way, the motor 110 can be safely shut off within 1 second.

Thanks to the two-channel logic circuitry of the safe electronic device 10, it can be reliably ascertained whether the two control units 50 and 60 have processed the same bit patterns.

Figure 2:
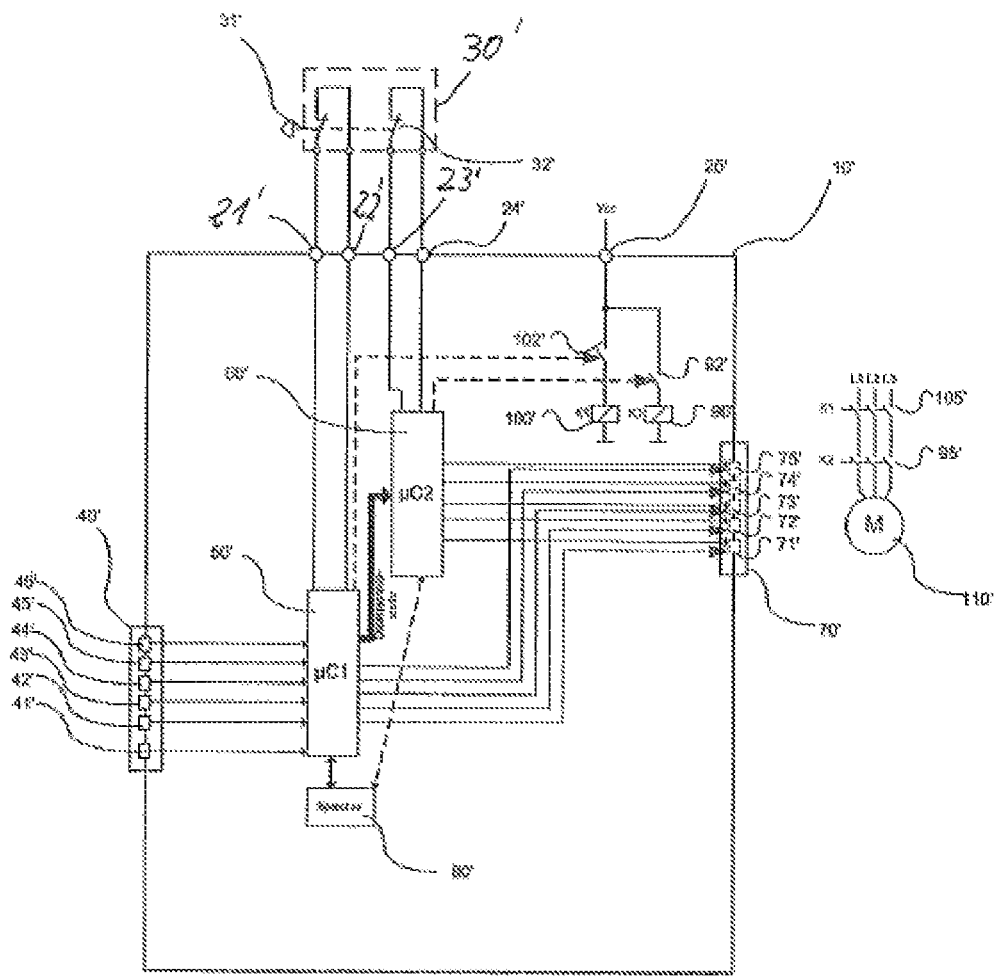
FIG. 2 shows a representation of an alternative safe electronic device having multicolored LED display elements which can be actuated to be luminous, as in one embodiment.

FIG. 2 illustrates an alternative safe electronic device 10' which differs from the safe electronic device 10 shown in FIG. 1 only in the design of the output device 70' and the activation of the output device 70'. The functioning of the two electronic devices 10 and 10' is substantially identical, so that only the differences of the electronic device 10' compared to the electronic device 10 will be described below.

According to an advantageous embodiment, the output device 70' is designed as a display device for outputting optical information. Preferably, the display device 70' has a plurality of multicolor display elements 71' to 75' which can be actuated to be luminous, each of which is associated with one of the switches 42' to 46' of an input device 40'. The input device 40' advantageously has a configuration switch 41'. Each multicolor display element 71' to 75' which can be actuated to be luminous contains two differently colored LEDs, for example a red LED and a green LED, which are disposed in a common housing. The DIP switch 42 [sic—i.e. 42'] is associated with the display element 71', the DIP switch 43' is associated with the display element 72', the DIP switch 44' is associated with the display element 73', the DIP switch 45' is associated with the display element 74', and the DIP switch 46 [i.e. 46'] is associated with the display element 75'.

As seen in FIG. 2, a first control unit 50' and a second control unit 60' individually control each of the display elements 71' to 75' on the output side. In the present example, the first control unit 50' actuates the red LEDs of the display elements 71' to 75', while the second control unit 60' actuates the green LEDs of the display elements 71' to 75'. In other respects, the design and mode of operation of the first control unit 50' and of the second control unit 60' correspond to the design and mode of operation of the first control unit 50 and the second control unit 60, respectively.

Further, similarly to the electronic device 10 illustrated in FIG. 1, the electronic device 10' may have connections 21' to 24' for switching on an emergency shutoff switch means 30', which is represented symbolically by two switches 31' and 32'. Connection terminals 25' serve, e.g., to switch on a power supply. Also, a storage device 80' which essentially fulfills the task of the storage device 80 can be provided. Similarly to the electronic device 10 illustrated in FIG. 1, the electronic device 10' can have two switching relays 90' and 100' which can be switched on via a switch 92' or 102'. Switch contacts 95' and 105', which are connected in series and which are associated with the switching relays 90' and 100', are associated with the electrical load 110'.

Now let us assume that a logical value "1" is set on the DIP switch 46' of the input device 40', as an input value, which is read in by the first control unit 50' and is transmitted to the control unit 60' via a data interface (represented symbolically as a black arrow). In error-free operation, both control units 50' and 60' actuate the two-colored display element 75', in response to the input values respectively received, with the first control unit 50' actuating the red LED and the second control unit 60' actuating the green LED, of the display element 75'. Accordingly, the display element 75' displays a luminous orange, which signals proper transmission of the input value. If one has a multicolored display element which can be actuated to be luminous, this is distinguished in that, with two LEDs, depending on the mode of actuation, the two LEDs can be caused to display, e.g., three different colors, e.g. red, green, or orange.

A fault in one of the two control units 50', 60', or in one of the two LEDs of the display element 75', or faulty data transmission via the data interface, would lead to a red or green display in the display element 75', depending on the fault. A red or green display in the display element 75' would be recognized by the user as an improper display.

These measures lead to the result that a proper display can be generated only if both of the control units 50' and 60' have recognized the identical input value.

The features ("aspects") of the invention will now be summarized.

A safe multichannel electronic device such as illustrated in FIG. 1 or FIG. 2 is proposed, which has an input device for inputting of input values. The electronic device further has a first control unit, which is connected on its input side to the input device. Further, a second control unit is provided, which is connected on its input side to the first control unit and on its output side to an output device. The first control unit is designed to read in an input value which is input, and to transmit the input value to the second control unit. The second control unit is designed, in response to the received input value, to actuate the output device such that the output device outputs optical and/or acoustic information, which in error-free operation corresponds to the input value which has been input. Further, the electronic device has a memory device in which a plurality of predetermined data items are stored, each of which is associated with a respective input value. The input values advantageously may be selected from a plurality of predetermined admissible input values. The input device is further designed to generate a confirmation signal which signals that the input value which has been input corresponds to the information which is] outputted from the output device. For this purpose, a confirmation signal can be input, e.g. via a switch, into (or at) the input device. The first control unit and/or the second control unit are/is designed to release the predetermined data content, which is associated with the input value which has been input, for further use, in response to an actuating signal from the input device.

The predetermined data items stored in the memory device may contain (may comprise) parameter values, preferably operating and/or configuration parameters, and/or programs for controlling the electronic device, or other functionalities. Some of the configuration parameters may comprise different delay times.

According to an advantageous embodiment of the input device, a plurality of first, manually actuatable switches, in particular DIP switches, is provided. In this case, the input of an input value is effected by setting a corresponding binary code or bit pattern on the DIP switches.

The input device may be comprised of a second manually operable switch. In this case, the control unit can be designed to read the input value entered in [(via)] a first position of the second switch.

Accordingly, the first position of the second switch can be interpreted as a configuration mode. The first control unit can additionally or alternatively be designed to interpret the second position of the second switch as a confirmation signal.

Numerous other variants are conceivable, for generating a confirmation signal or for initiating or terminating the configuration mode.

Alternatively, or optionally, the input device may have at least one potentiometer. In this, the input value which is input corresponds to a predetermined analog input value. An A/D converter is provided which is designed to convert an analog input signal into a binary signal.

In order to be able to output optical information, the output device is in the form of a display device. Preferably, the display device comprises a plurality of monochrome LED display elements which can be actuated to be luminous, and each one of such elements is associated with one of the switches.

Alternatively, the display device may also have a plurality of multicolored display elements which can be actuated to be luminous, each of which display elements is associated with one of the switches, the first control unit and the second control unit being connected to each multicolored luminous display element, and being designed to control the multicolored luminous display elements in response to the received input value. Preferably, each multicolored luminous display element has two differently colored LEDs which are accommodated in a common housing of the respective display element.

The safe electronic device may be in the form of a safe switching device for safe switching off of an electrical consuming device (electrical load). In order to enable time-dependent shutting off of the electrical load, at least some of the data items stored in the storage device may represent various delay times.

Preferably, the first control unit and the second control unit are designed to cause the electrical load to shut off after the delay time has elapsed, in response to a trigger signal, which can come, e.g., from an emergency shutoff switch, and in response to the value of said delay time which value may be input into the input device.

In order to bring about, e.g., a fault-free configuration of the safe electronic device, a configuration mode is first initiated in the safe electronic device, in which an association table is stored, in which a plurality of defined data items, each of which is associated with one of the predetermined input values, are stored. An input value is now input to the safe electronic device, an inputted value. Under the control of a first control unit, the inputted value is read in and is transmitted to a second control unit. In response to the inputted value, optical and/or acoustic information is output, under the control of the second control unit.

On the safe electronic device it is now confirmed whether the inputted value corresponds to the output optical and/or acoustic information. If it does, the data item which is associated with said input value is released for further use.

It is also conceivable that the input values are selected from a plurality of admissible input values, wherewith first control unit may be designed to detect whether and inputted value is in fact an admissible input value. If it is not an admissible input value, the first control unit can request (command) the second control unit to output a corresponding fault report via the output device.

The safe electronic device has the advantage that it requires only a single-channel input device, which leads to savings in space and costs. Further, it enables fault-free retrieval of a large number of different data items which are stored in the storage device, by simple means, for operation of the electronic device.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to a railing system. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights that include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

LIST OF REFERENCE NUMERALS

10,10' Safe switching device [(or more generally, safe electronic device)].
21-24 Connections for actuating an emergency shutoff switch.
21'-24' Connections for actuating an emergency shutoff switch.
25, 25' Connecting terminals for switching on a power supply.
30, 30' Emergency shutoff switch.
31, 32 Switches which are components of the emergency shutoff switch.
31', 32' Switches which are components of the emergency shutoff switch.
40, 40' Input device.
41, 41' Configuration switch.
42-46 DIP switches.
42'-46' DIP switches.
50, 50' First control unit.
60, 60' Second control unit.
70, 70' Output device.
71-75 Monochrome display elements which can be actuated to be luminous.
71'-75' Multicolored display elements which can be actuated to be luminous.
80, 80' Storage device.
90, 90' Switching relay.
95, 95' Switch contacts.
100, 100' Switching relay.
92, 102 Switch for switching on the relay.
92', 102' Switch for switching on the relay.
105, 105' Switch contacts.
110, 110' Electrical load (electrical consuming device).

TRANSLATION OF LEGEND IN THE FIGURES

FIG. 1: Speicher=Storage means; muC1=microcontroller 1; muC2=microcontroller 2; M=motor; K1=Switching relay 100; K2=Switching relay 90; Vss [?]=Supply voltage.

FIG. 2: Datenschnittstelle=Data interface; L1, L2, L3=Load elements.

The invention claimed is:
1. A safe electronic device comprising:
 a single-channel input device for receiving at least one input value from a user of the safe electronic device and for generating a confirmation signal, wherein the input device comprises a plurality of switches, a first of the plurality of switches comprising read and confirm positions, and the confirmation signal being generated responsive to the first switch being set in the confirm position;
 an output device for outputting information including one of optical information or acoustic information to indicate the received at least one input value to the user;
 a storage device comprising a plurality of predetermined data items, each associated with a respective one of the at least one input value;
 first and second microcontrollers coupled to one another such that an input of the second microcontroller receives transmissions from an output of the first microcontroller;

in which the first microcontroller couples to the input device, reads the at least one input value from the input device responsive to the first switch being in the read position, and transmits the read at least one input value to the second microcontroller;

in which the second microcontroller couples to the output device and responsively to the at least one input value being transmitted from the first microcontroller to the second microcontroller, actuates the output device to output the information to the user;

wherein, responsive to the first switch being set to the confirm position to confirm that the information indicated on the output device corresponds to the at least one input value, at least one of the first and second microcontrollers releases the predetermined data items associated with the at least one input value in response to the generated confirmation signal; and wherein the predetermined data items include parameter values to operate, configure, or control the safe electronic device.

2. The safe electronic device according to claim 1, wherein the plurality of switches, are DIP switches and the at least one input value is received as a binary code and/or bit pattern from said plurality of switches.

3. The safe electronic device according to claim 1, wherein the first microcontroller reads the at least one input value when the first switch is in a read position, and interprets the at least one input value as the confirmation signal when the first switch is in the confirming position.

4. The safe electronic device according to claim 1, wherein the input device comprises at least one potentiometer, the at least one input value is associated with one potentiometer position corresponding to an analog input signal, and an A/D converter for converting the analog input signal into a binary signal.

5. The safe electronic device according to claim 1, wherein the output device is a display device for outputting optical information.

6. The safe electronic device according to claim 5, wherein the display device comprises a plurality of monochrome display elements capable of being luminous, including LED display elements, and each of the plurality of monochrome display elements is associated with the plurality of switches.

7. The safe electronic device according to claim 5, wherein the display device comprises a plurality of multicolored display elements capable of being luminous, each of the plurality of multicolored display elements is associated with the plurality of switches; and the first and the second microcontrollers are connected to the multicolored display elements, and actuate said multicolored display elements in response to a respective at least one input value.

8. The safe electronic device according to claim 1, wherein the safe electronic device is used for a safe switching off of an electrical load.

9. The safe electronic device according to claim 8, wherein at least some of the plurality of predetermined data items represent delay times.

10. The safe electronic device according to claim 9, wherein the first and the second microcontrollers cause the electrical load to be shut off after a delay time has elapsed, in response to any of a triggering signal and the delay time which is input into the input device.

11. A method of fault-free configuration of a safe electronic device, the method comprising steps of:

providing a single-channel input device for receiving at least one input value from the user of the safe electronic device and for generating a confirmation signal, wherein the input device comprises a plurality of switches, a first of the plurality of switches comprising read and confirm positions, and the confirmation signal being generated responsive to the first switch being set in the confirm position;

an output device for outputting information including one of optical information or acoustic information to indicate the received at least one input value to the user;

a storage device comprising a plurality of predetermined data items, each associated with a respective one of the at least one input value; and first and second microcontrollers coupled to one another such that an input of the second microcontroller receives transmissions from an output of the first microcontroller, reading, on the first microcontroller, the at least one input value from the input device responsive to the first switch being in the read position;

transmitting, on the first microcontroller, the read at least one input value to the second microcontroller; and when the at least one input value is transmitted actuating, by the second microcontroller, the output device to output the information;

outputting the information by the output device; and responsive to the first switch being set to the confirm position to confirm that the information indicated on the output device corresponds to the at least one input value, at least one of the first and second microcontrollers releases the predetermined data item associated with the at least one input value in response to the generated confirmation signal; and wherein the predetermined data items include parameter values to operate, configure or control the safe electronic device.

* * * * *